W. T. SPRUELL.
ATTACHMENT FOR SEED PLANTERS.
APPLICATION FILED AUG. 26, 1920.

1,403,456.                                    Patented Jan. 10, 1922.

Inventor
W. T. Spruell,

By Geo. P. Kimmel
Attorney

UNITED STATES PATENT OFFICE.

WILLIAM T. SPRUELL, OF PHOENIX, ARIZONA.

ATTACHMENT FOR SEED PLANTERS.

1,403,456.  Specification of Letters Patent.  Patented Jan. 10, 1922.

Application filed August 26, 1920. Serial No. 406,198.

*To all whom it may concern:*

Be it known that I, WILLIAM T. SPRUELL, a citizen of the United States, residing at Phoenix, in the county of Maricopa and State of Arizona, have invented certain new and useful Improvements in an Attachment for Seed Planters, of which the following is a specification.

This invention relates to attachments for seed planters.

The main object of the invention is to provide a simple and efficient attachment for seed planters the use of which will ensure the planting of the seed at a uniform depth regardless of the condition of the soil whereby a uniform stand is obtained of the plants germinated from the seed so planted.

Another object is to provide such an attachment so constructed that inexperienced persons may operate a planter equipped therewith and which also operates to support the weight of the tongue and thus relieves the horses of this burden.

Another object is to provide such an attachment so constructed as to ensure a firm seed bed to conserve moisture and facilitate the germination of the seed.

With these and other objects in view, the invention consists in certain novel features of construction as hereinafter shown and described and then specifically pointed out in the claims and in the drawings illustrative of the preferred embodiment of the invention.

In the accompanying drawing:

Fig. 3 is a detail perspective view of one member of the supporting frame for said attachment, and, Fig. 4 is a similar view of another member thereof.

Figure 1:
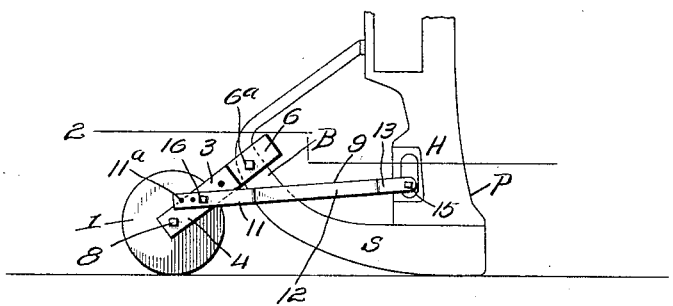
Figure 1 represents a side elevation of a portion of a seed planter equipped with this improved attachment.
Figure 1:
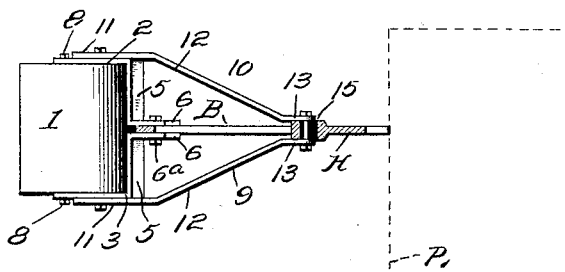

In the embodiment illustrated the attachment constituting this invention comprises a pair of wheels shown at 1 which are designed for use on a double row seed planter for planting either corn, cotton seed or the like, but obviously the attachment may be used equally as well on other planters. In the double row planter shown at P in dotted lines in Fig. 2 two of these attachments are employed both of which are exactly alike and hence one only will be described in detail.

The wheel or roller 1 has a tread of about ten inches wide, more or less and the diameter thereof is about eight inches. This wheel 1 is mounted in a supporting frame composed of two sections 2 and 3 each of which is exactly alike and each comprises two arms 4 and 6 arranged in parallel planes and connected by a rightangularly disposed arm 5, the arm 4 extending in one direction and the arm 6 in the opposite direction. The arms 4 of the two sections are arranged adjacent the opposed ends of the roller 1 and have passed through their free ends and through the roller 1 an axle 8. These arms 4 are equipped with a plurality of longitudinally spaced apertures 7 for the reception of the axle to provide for variation in the depth the seed is to be planted as will be hereinafter more fully described.

The arms 5 of the two sections 2 and 3 extend toward each other adjacent the periphery of the wheel 1 and their arms 6 extend rearwardly and have mounted between them the upcurved portions B of the shoe S of the planter being secured thereto by a bolt 6$^a$.

Figure 2:
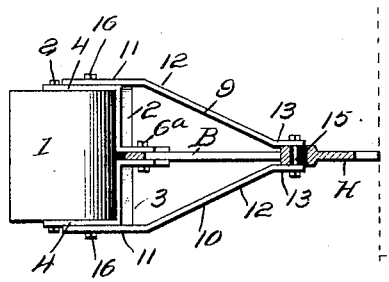
Fig. 2 is a horizontal section taken on the line 2—2 of Fig. 1 with the planter indicated by dotted lines.
Figure 2:
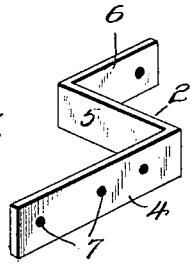

Two bars 9 and 10 connect arms 4 of the sections 2 and 3 with the standard H of the planter as is shown clearly in Figs. 1 and 2. These bars 9 and 10 are exactly alike and each is provided with two rectilinear end members 11 and 13 connected by an obliquely disposed member 12 all of which are formed from a single bar bent to position the arms or members as above described. The arm 11 is longer than the arm 13 and is provided with a plurality of longitudinally spaced apertures 11$^a$ designed to receive bolts 16 which connect the arms 11 to the arms 4 of the wheel supporting sections 2 and 3. The rear arm 13 of each of the bars 9 and 10 has an aperture 14 to receive a bolt 15 which also extends through the planter standard H as is shown clearly in Figs. 1 and 2.

From the above description it will be seen that the attachment may be set by adjusting the positions of the arms or bars 9 and 10. When it is desired to deepen the planting of the seed the bars 9 and 10 are lengthened by varying the position of the bolts 16 placing them in one of the forward apertures 11$^a$. This adjustment throws the wheel 1 upward and consequently causes the planter shoe S to more deeply enter the ground. It is of course understood that when it is desired to obtain a shallow planting of the seed, the bars 9 and 10 are shortened or rather the distance between the bolts 15 and 16 is shortened. This may be also accomplished by inserting the bolt 16 in one of the inner apertures 7 of the sections 2 and 3.

The main advantage of this attachment is that when the planter is set it plants the seed at a uniform depth regardless of whether the ground be hard or soft and it also insures that anyone whether experienced or not can drive the team and plant the seed at a uniform depth.

Obviously this attachment is very simple and can be readily understood by inexperienced operators and yet will absolutely insure the planting of the seed at a uniform depth after it is once set.

The preferred embodiment of the invention is disclosed in the drawings and set forth in the specification, but it will be understood that any modifications within the scope of the claims may be made in the construction without departing from the principle of the invention or sacrificing any of its advantages.

What I claim is:

1. An attachment for seed planters comprising a roller to be located in advance of a planter shoe or furrow opener, a supporting frame therefor including means for connection to the upturned portion of a planter shoe, and a connection for attaching said frame to a planter shoe standard, said last mentioned means being adjustably connected with said frame.

2. An attachment for seed planters comprising a roller to be located in advance of a planter shoe or furrow opener, a supporting frame therefor including means for connection to a planter shoe at the upturned end thereof, a connection for attaching said frame to a planter shoe standard, said connection being adjustable to vary the planting depth of the seed.

3. An attachment for seed planters comprising a roller to be located in advance of a planter shoe or furrow opener, a supporting frame therefor composed of sections having arms at one end to span said roller, an axle extending longitudinally through said roller and journaled in said arms, said sections having inwardly offset portions arranged adjacent the periphery of the roller, the rear ends of said sections being parallel and adapted to straddle and be secured to the upturned ends of a planter shoe, and bars adjustably connected at one end with the roller engaging arms of said frame sections and detachably connected at their upper ends with a planter shoe standard, said bars having rectilinear ends with an obliquely disposed portion between said ends whereby the rear ends of said bars are positioned in close proximity and adapted to straddle the planter shoe standard.

In testimony whereof I affix my signature hereto.

WILLIAM T. SPRUELL.